United States Patent
Rose et al.

(10) Patent No.: US 9,858,700 B2
(45) Date of Patent: Jan. 2, 2018

(54) ANIMATION DATA TRANSFER BETWEEN GEOMETRIC MODELS AND ASSOCIATED ANIMATION MODELS

(71) Applicant: Lucasfilm Entertainment Company Ltd., San Francisco, CA (US)

(72) Inventors: Rachel Rose, Novato, CA (US); Yuting Ye, San Francisco, CA (US); Scott Jones, San Rafael, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 156 days.

(21) Appl. No.: 14/711,542

(22) Filed: May 13, 2015

(65) Prior Publication Data

US 2016/0335793 A1 Nov. 17, 2016

(51) Int. Cl.
*G06T 13/40* (2011.01)
*G06T 15/10* (2011.01)

(52) U.S. Cl.
CPC ................... *G06T 13/40* (2013.01)

(58) Field of Classification Search
None
See application file for complete search history.

(56) References Cited

U.S. PATENT DOCUMENTS 8,624,904 B1 * 1/2014 Koperwas ............... G06T 13/40
345/473
2006/0290693 A1 * 12/2006 Zhou ........................ G06T 17/20
345/420

(Continued)

OTHER PUBLICATIONS

3D Buzz, downloaded @ https://www.3dbuzz.com/forum/threads/50109-Low-poly-to-high-poly-animation, posted online in Nov. 11, 2003.*

(Continued)

Primary Examiner — Yingchun He
(74) Attorney, Agent, or Firm — Kilpatrick Townsend & Stockton LLP

(57) ABSTRACT

Systems and techniques are provided for transferring changes in animation data between geometric models of a character having different resolutions. For example, systems and techniques are provided for transferring changes in geometric properties between the geometric models. A method may include obtaining a first geometric model of the character and a second geometric model of the character, the geometric models having different resolutions with different numbers of data points. The method may further include determining one or more correspondences between data points of the first geometric model and data points of the second geometric model. The correspondences include one or more data points of the first geometric model that overlap with one or more data points of the second geometric model. The method may further include determining a feature change in the first geometric model, which includes a change in a geometric property of at least one data point of the first geometric model relative to an initial geometric property of the at least one data point prior to the change. The method may further include transferring the feature change in the first geometric model to the second geometric model using the one or more correspondences, including interpolating a change in a geometric property of at least one data point of the second geometric model.

20 Claims, 8 Drawing Sheets

(56) References Cited

U.S. PATENT DOCUMENTS

2007/0024632 A1\* 2/2007 Couture-Gagnon .... G06T 19/00
  345/581
2010/0321386 A1\* 12/2010 Lin ........................ G06T 13/00
  345/420

OTHER PUBLICATIONS

Kobbelt et al. "Multiresolution Shape Deformations for Meshes with Dynamic Vertex Connectivity", Eurographics, 2000 vol. 19 2000, No. 3.\*

\* cited by examiner

ANIMATION DATA TRANSFER BETWEEN GEOMETRIC MODELS AND ASSOCIATED ANIMATION MODELS

FIELD

The present disclosure generally relates to transferring animation data between geometric models of a character and between associated animation models. For example, systems and techniques may be provided for transferring geometric property changes between geometric models having different resolutions and between corresponding animation models.

BACKGROUND

Geometric models of a computer-generated character may include different resolutions. For example, a low resolution model of a character may include fewer features than a higher resolution model of the same character. Maintaining changes of different properties of the geometric models across the different resolutions is a time consuming process and is prone to errors. Embodiments of the invention address these and other problems both individually and collectively.

SUMMARY

Techniques and systems are described for transferring animation data between geometric models or representations that represent a character and between animation models that can be used to control or manipulate geometric models. A geometric model may define a geometry of a computer-generated character, such as a computer-generated representation of a subject or actor, a computer-generated representation of a fictional character, or other computer-generated character. The animation data may include various geometric properties associated with data points of the geometric models. A character may be associated with multiple geometric models that have varying resolutions with different numbers of data points. The techniques and system described herein allow a change made to a geometric model of a character to be automatically transferred to other resolutions of geometric models of the character and corresponding animation models without manual intervention.

To allow the animation data to be transferred between geometric models and between animation models, correspondences between the different geometric models of a character may be determined. For example, data points of the different geometric models may be overlaid over one another. Correspondences between the data points of the different geometric models may then be determined based on overlapping data points. Initial geometric properties associated with data points of the different geometric models may also be determined. The correspondences and initial geometric properties can then be used, for example, to determine feature changes in one or more geometric models and to apply the feature changes to one or more other geometric models.

When a feature change occurs in one geometric model for a character, that feature change can be transferred to the other geometric models for the same character across all data points. For example, a geometric property of a first geometric model may be modified by a modeler, animator, editor, designer, or other animation personnel. A geometric property may include a physical property of the first geometric model, a property of an animation model that controls feature changes of the first geometric model (e.g., using blendshapes and controls, geometric deformers, or the like), or other suitable geometric properties. The modification in the geometric property may be determined (e.g., using one or more correspondences, initial geometric properties, and/or any other suitable characteristics of the first geometric model) and may be transferred to the other geometric models data point by data point. Due to a higher resolution geometric model having a higher number of data points than a lower resolution geometric model, the data points of the lower resolution model will overlap with a subset of the data points of the higher resolution model. As a result, there will be some data points of the higher resolution geometric model that do not have correspondences with data points of the lower resolution model. For data points in the other geometric models that do not have correspondences to the changed data points of the first geometric model, geometric properties may be interpolated using a smoothing function that generates a smooth change in geometric property values for those data points. The smoothing function allows the original feature details of the other geometric models to be maintained in an automated manner when changing a property of the other geometric models.

In some examples, the modification in the geometric property may be determined and transferred to the other geometric models in a change space, so that nuanced feature details are maintained across all resolutions. A change determined in a change space includes differences between updated values (after one or more feature changes) and initial values when the correspondences were determined. For example, if a position of a data point vertex is determined to have moved from position A to position C, the feature change in change space is an amount of change required to go from position A to position C. By using a change space instead of an absolute position or value of a point after a change is made, data point values of other geometric models can be modified by the change amount determined in the change space, instead of indicating an absolute position or value that the data point values should be. The change space allows changes that have already been applied to be maintained across all resolutions of geometric models for a character. For example, subtle revisions that are made to a high resolution geometric model can be maintained when feature changes from other resolution geometric models are applied to the high resolution geometric model, while maintaining the subtle revisions that were previously made.

According to at least one example, a computer-implemented method of transferring changes in geometric properties between geometric models of a character having different resolutions may be provided that includes obtaining a first geometric model of the character and a second geometric model of the character, the first and second geometric models having different resolutions with different numbers of data points. The method further includes determining one or more correspondences between data points of the first geometric model and data points of the second geometric model, the one or more correspondences including one or more data points of the first geometric model that overlap with one or more data points of the second geometric model. The method further includes determining a feature change in the first geometric model, the feature change including a change in a geometric property of at least one data point of the first geometric model relative to an initial geometric property of the at least one data point prior to the change. The method further includes transferring the feature change in the first geometric model to the second geometric model using the one or more correspondences, the transferring including interpolating a change in a geometric property of at least one data point of the second geometric model.

In some embodiments, a system may be provided for transferring changes in geometric properties between geometric models of a character having different resolutions. The system includes a memory storing a plurality of instructions and one or more processors. The one or more processors are configurable to: obtain a first geometric model of the character and a second geometric model of the character, the first and second geometric models having different resolutions with different numbers of data points; determine one or more correspondences between data points of the first geometric model and data points of the second geometric model, the one or more correspondences including one or more data points of the first geometric model that overlap with one or more data points of the second geometric model; determine a feature change in the first geometric model, the feature change including a change in a geometric property of at least one data point of the first geometric model relative to an initial geometric property of the at least one data point prior to the change; and transfer the feature change in the first geometric model to the second geometric model using the one or more correspondences, the transferring including interpolating a change in a geometric property of at least one data point of the second geometric model.

In some embodiments, a computer-readable memory storing a plurality of instructions executable by one or more processors may be provided. The plurality of instructions comprise: instructions that cause the one or more processors to obtain a first geometric model of the character and a second geometric model of the character, the first and second geometric models having different resolutions with different numbers of data points; instructions that cause the one or more processors to determine one or more correspondences between data points of the first geometric model and data points of the second geometric model, the one or more correspondences including one or more data points of the first geometric model that overlap with one or more data points of the second geometric model; instructions that cause the one or more processors to determine a feature change in the first geometric model, the feature change including a change in a geometric property of at least one data point of the first geometric model relative to an initial geometric property of the at least one data point prior to the change; and instructions that cause the one or more processors to transfer the feature change in the first geometric model to the second geometric model using the one or more correspondences, the transferring including interpolating a change in a geometric property of at least one data point of the second geometric model.

In some embodiments, the method, system, and computer-readable memory described above may further include wherein determining the one or more correspondences between the data points of the first geometric model and the data points of the second geometric model includes overlaying the data points of the first geometric model and the data points of the second geometric model.

In some embodiments, the data points of the first geometric model overlap with a subset of the data points of the second geometric model.

In some embodiments, the geometric property of the at least one data point of the second geometric model includes a position of a vertex of the at least one data point, an amount of change in a position of the vertex of the at least one data point, or a weight associated with the vertex of the at least one data point that defines an amount by which the vertex of the at least one data point changes with respect to a skeleton of the second geometric model.

In some embodiments, determining the feature change includes determining a change in a position of a vertex of the at least one data point of the first geometric model, and wherein interpolating the change in the geometric property includes interpolating a change in a position of a vertex of the at least one data point of the second geometric model.

In some embodiments, determining the feature change includes determining an amount of change in a position of a vertex of the at least one data point of the first geometric model caused by one or more blendshapes of a first animation model for the character, the first animation model including blendshapes that are configured to change features of the first geometric model of the character. In some examples, interpolating the change in the geometric property includes interpolating an amount of change in a position of a vertex of the at least one data point of the second geometric model caused by one or more blendshapes of a second animation model for the character, the second animation model including blendshapes that are configured to change features of the second geometric model of the character.

In some embodiments, determining the feature change includes determining a change in a weight associated with a vertex of the at least one data point of the first geometric model, wherein the weight defines an amount by which a position of the vertex changes with respect to a skeleton of the first geometric model. In some examples, wherein interpolating the change in the geometric property includes interpolating a change in a weight associated with a vertex of the at least one data point of the second geometric model, wherein the weight defines an amount by which a position of the vertex changes with respect to a skeleton of the second geometric model.

In some embodiments, determining the feature change includes determining the change in the geometric property in a change space, the change space including an amount of change in the geometric property relative to an initial geometric property of the at least data point of the first geometric model.

In some embodiments, interpolating the change in the geometric property of the at least one data point of the second geometric model includes performing a Laplace smoothing function.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will be described in more detail below in the following specification, claims, and accompanying drawings.

BRIEF DESCRIPTION OF DRAWINGS

Illustrative embodiments of the present invention are described in detail below with reference to the following drawing figures.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Figure 1:
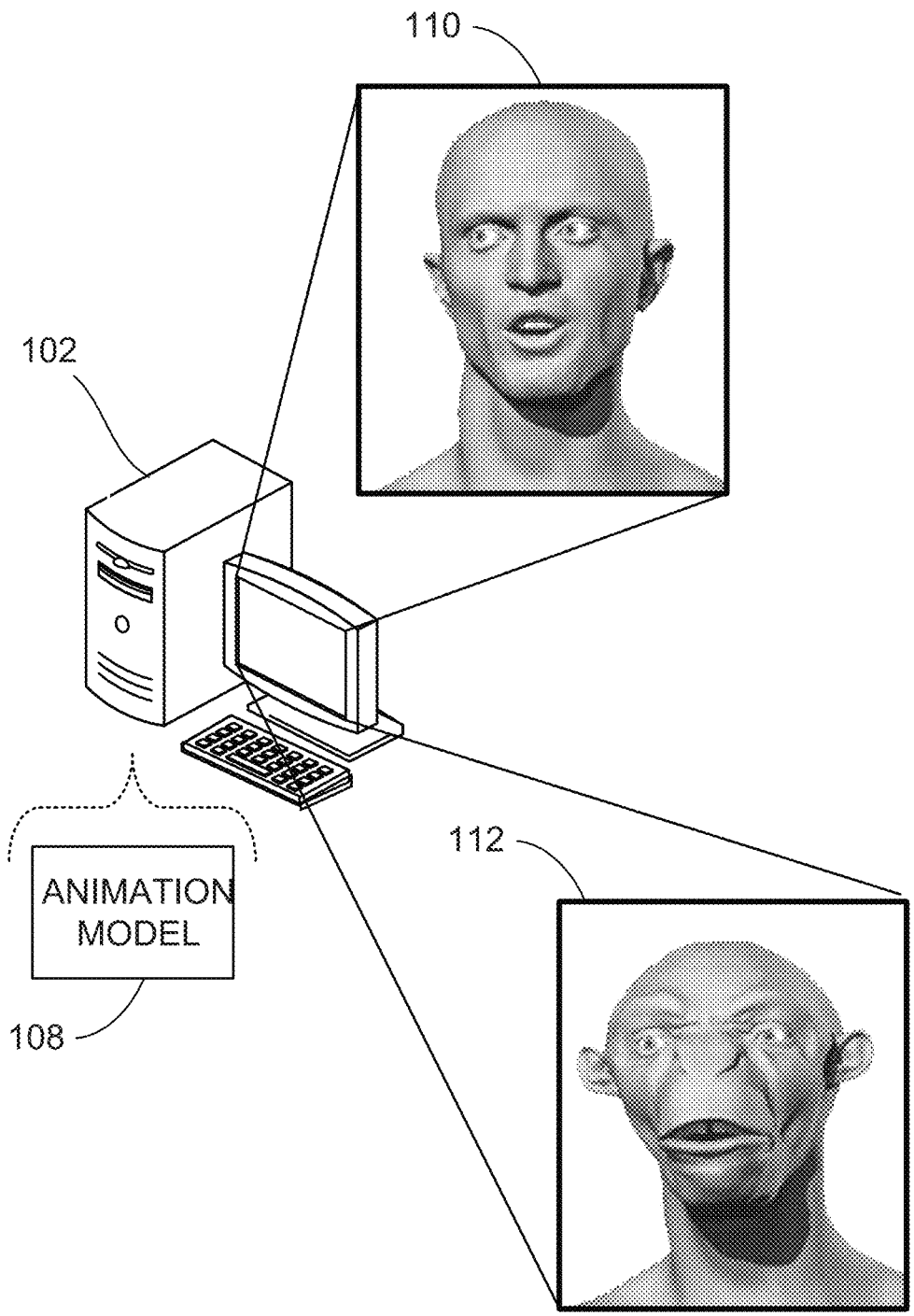
FIG. 1 illustrates an example of a system for capturing a performance of a character using facial motion information and an animation model.

Geometric models are used to define geometries of computer-generated characters that are featured in multimedia productions, such as movies, video games, television shows, or the like. A computer-generated character may include a computer-generated representation of a subject or actor, a computer-generated representation of a fictional character, or other computer-generated character. FIG. 1 is a block diagram illustrating an example of an animation system 100 that can be used to create geometric models and animation models for computer-generated characters 110 and 112. An animation model can be used to control a geometric model of a character. Multiple geometric models and animation models can be created for characters 110 and 112.

A geometric model includes numerous data points that define properties of a character. For example, each data point of a geometric model may be associated with various geometric properties for that point, such as a position of the point to define a shape of the character, an amount of change for the point when a blendshape is dialed, a skinning weight, or other suitable geometric properties. Further details relating to geometric properties of geometric model data points are described below.

The animation system 100 can be used to generate an animation model 108. In some embodiments, the animation system 100 captures expressions of a subject (e.g., facial expressions, movements, or other suitable expressions), such as an actor, and uses the captured expressions to produce an animation model 108. Once generated, the animation model 108 can be controlled to cause a computer-generated representation 110 of the subject's face to perform the captured expressions or other expressions derived using the animation model 108. By processing the captured expressions together, the animation model 108 can modify the computer-generated representation 110 of the subject or a computer-generated representation 112 of a character to depict various expressions.

One or more techniques may be implemented for determining expressions of the subject. The animation system 100 can capture imagery, such as video images or scans of expressions of the subject, and can create the animation model 108 using the captured imagery. For example, a computer system 102 may be in communication with one or more image capture devices that can be used to capture images of the subject's face. The one or more image capture devices may capture the images of the subject and may provide data that represents the images to the computer system 102.

In some embodiments, an animation model (e.g., animation model 108 or other animation model) for the computer-generated representation 112 of the character may be generated without using captured imagery. For example, the character may not be representative of a live subject. An animation model for such a character may be generated based on how a modeler, animator, editor, designer, or other animation personnel desires that character to appear when animated.

An animation model may include various components. For example, an animation model may implement a collection of deformable geometries that correspond to various shapes of the subject (e.g., various shapes of the subject's face, the subject's body, or the like). In one example, facial shapes may be patterned after human facial muscles. In some embodiments, the shapes may also be referred to as blendshapes. The shapes may have geometries that can be controlled, adjusted, deformed, or weighted, alone or in combination with other shapes, so the animation model is able to represent a particular expression using one or more of the blendshapes. The animation model 108, for example, can use the resulting shape geometries to define facial features of the computer-generated representation 110 of the subject or a computer-generated representation 112 of a character. Each data point vertex of a geometric model may have a value associated with one or more blendshapes. A blendshape value for the vertex may define an amount of change in position of that vertex when a blendshape geometry is changed. For example, the blendshape value may direct the vertex to change a certain amount when that blendshape is dialed (e.g., using the controls described below). In some embodiments, the blendshape value may also define a direction in which the vertex is to move when a blendshape is adjusted.

An animation model may further include skinning weights. A skinning weight is a weight that defines an amount by which points on the skin of a character changes with respect to a skeleton of the character. The skeleton may be part of the animation model, or may be represented by a separate set of data that the animation model can access. For example, when a bone moves, the skin surrounding that bone has to move relative to the bone. The skinning weights define how the points on the skin move when the bone moves. Each data point vertex of a geometric model for the character may have one or more skinning weights that define movement of each vertex relative to one or more bones of the skeleton. For example, the skinning weight for a given vertex defines an amount by which a position of the vertex changes with respect to a bone of the skeleton.

The animation model 108 may also include adjustable controls that control one or more components of the animation model 108. For example, the adjustable controls can define the geometries of the shapes of the animation model 108. In some embodiments, the adjustable controls may be represented on a graphical interface by a slider, a dial, or some other control mechanism that allows manual adjustment of the control. In some examples, an adjustable control may control a group of shapes to achieve different expressions. In some examples, a separate adjustable control may exist for a shape. In one example, a control may define a geometry for one or more shapes of the animation model 108 that control a character's nose. Values for the adjustable controls may range from 0 to 1, from −1 to 1, or any other range of values. For example, a range of values may include 0 for a minimum amount and 1 for a maximum amount. As another example, a range of values may include −1 for a maximum amount in one dimension or direction, and a 1 for a maximum amount in another dimension or direction. For example, a −1 value for an adjustable control for a mouth may cause the mouth to frown by causing the corners of the mouth to go downward, whereas a +1 value for the same adjustable control may cause the mouth to smile by causing the corners of the mouth to go upward. One of ordinary skill in the art will appreciate that other control ranges may be used and that different control ranges may be used for different adjustable controls.

As values of the adjustable controls change, the vertex positions of data points on a corresponding geometric model will change, causing feature changes to occur in the geometric model. The resulting change of the data points will be determined based on the geometric properties associated with the data points. In one example, a blendshape value for a data point will define how much that data point moves when an adjustable control associated with the blendshape is adjusted. For instance, the blendshape value may indicate that when the control value is dialed from 0 to 1, the position of the data point should move fifty units (e.g., centimeters, inches, or other unit of distance). In another example, a skinning weight for the data point may define how much that data point moves relative to one or more bones when one or more adjustable controls associated with the one or more bones are adjusted. For example, the skinning weight may define that the data point is to follow a point on a first bone by 50% and a data point on a second bone by 50%.

The animation model may include other components other than those described herein. For example, the animation model may include other deformers that can control aspects of a geometric model and that can be adjusted using an adjustable control. Per-vertex data that is controlled by these deformers may also be transferred among geometric models and animation models of different resolutions. One example of other per-vertex data that can be transferred using the techniques described herein includes character simulation parameters. Character simulation parameters include, for example, parameters such as the rigidness of the flesh that can be used to simulate the bounce of flesh on the surface of a character. Another example of other per-vertex data that can be transferred includes skin tension information that can be used by a deformer to introduce wrinkling on the character. One of ordinary skill in the art will appreciate that the techniques described herein can be used for any component of an animation model.

Varying resolutions of geometric models may be created for the same computer-generated character. A lower resolution geometric model of a character may include fewer features, and thus fewer data points, than a higher resolution geometric model of the same character. For example, a first geometric model may have a number of data points, a second geometric model may have 50% of the data points of the first geometric model, and a third geometric model may have 25% of the data points of the first geometric model. Each geometric model may be associated with a corresponding animation model that can be used to control features of the geometric model. Accordingly, multiple animation models of varying resolutions may also be provided for a single character.

Various reasons exist for having multiple geometric models of different resolutions for a single computer-generated character. In some instances, depending on a particular task a modeler, animator, editor, designer, or other animation personnel is working on, different resolutions of a geometric model will have different performance implications. For example, if a character needs to be animated, a higher resolution geometric model may animate more slowly than a lower resolution geometric model that has less data points to process. When a higher resolution geometric model is animated, for example, the animation may have a delay or lag for a period of time before the computer-generated character moves according to the animation. This delay prevents the animation personnel from seeing a fluid motion of the character when animated. In such an example, a lower resolution geometric model (e.g., with 75%, 50%, 25%, or other percentage of the data points of the higher resolution geometric model) may be used to animate the character.

Different resolutions of geometric models may also be used for a computer-generated character depending on how far the character is from the camera or the perspective of the camera in animated media. For example, in a scene in which the character is far away from the perspective of the camera, a lower resolution geometric model may be used because fewer details will be seen by the viewer of the content. As the character gets closer to the perspective of the camera (e.g., as a shot zooms in, a different scene, or other situation in which the perspective of the character changes), higher resolutions may be used to show more details of the character.

Various changes may be made to a given geometric model, or corresponding animation model, of any of the available resolutions. For example, one or more geometric properties of a geometric model may be modified for different reasons. One example of geometric properties includes actual vertex positions of data points on the geometric model. Vertex positions may be modified, for example, by an artist that determines the geometry of the character needs to change. For example, the artist may want to add a feature to a character, which requires that points on the character move positions.

Another example of a geometric property includes a blendshape geometric property that defines an amount of change in a position of a vertex of a data point caused by one or more blendshapes of an animation model for the character. For example, a data point vertex of a geometric model may have one or more blendshape values. As described above with reference to FIG. 1, an animation model includes blendshapes that are configured to change features of a geometric model of a character. Each data point of the geometric model may be associated with a blendshape value that indicates how much that point changes when an adjustable control value is applied to a blendshape. One or more adjustable controls of the animation model indicate how a blendshape affects different data points when the control is at a particular value. For example, a range of control values that control a given blendshape may go from 0 to 1. The blendshape may cause a data point vertex to change from position (0, 0) to position (0, 100) when the control value is dialed to 1. A modeler, animator, editor, designer, or other animation personnel may change the blendshape geometric property so that the blendshape causes the data point vertex to change from position (0, 0) to position (0, 150) when the control value is dialed to 1. In this example, a change of fifty units is applied to the blendshape. The blendshape geometric property may be changed, for example, to emphasize or deemphasize certain features of the computer-generated character as the character is animated. For example, a blendshape may cause a character's mouth to move up and down depending on the value of the control that controls the blendshape. The blendshape geometric property for the blendshape may be changed so that the mouth is moved further up or down in a more dramatic fashion.

Another example of a geometric property includes a skinning weight geometric property that defines a weight associated with a vertex of a data point of a geometric model. The skinning weight defines an amount by which the vertex moves or changes positions with respect to a skeleton of the geometric model. The weight may be part of an animation model for the character. For example, the data points of the geometric model define the skin geometry of the character. Each data point may be associated with a skinning weight that defines how much that point on the skin moves with respect to a bone of the geometric model. For example, when an elbow of the character moves, a set of weights associated with data points of skin around the elbow may cause those data points to move in relation to bones associated with the elbow. A weight for a given data point may control the data point so that when various bones around the elbow move, the point will follow one bone 50% and will follow another bone 50%.

As the geometric properties of a character's geometric model in a given resolution are changed, corresponding changes need to be made to the geometric models of the character in other resolutions. It is important to maintain the changes across the geometric models so that the details of the character (e.g., overall movement, shape, and other features of the character) remain consistent regardless of which geometric model is being used at any given moment in a production. For example, as a camera perspective changes in a movie (or other media production), a geometric model for a computer-generated character in the scene may switch from one resolution to another resolution. It is desirable to have the features of the two geometric models of different resolutions look as much alike as possible.

One option for transferring changes among geometric models is for animation personnel to work with and make changes to high resolution geometric models, and then push changes to corresponding points on lower resolution models. This option is available due to a low resolution geometric model including a subset of data points that are in a higher resolution geometric model. However, as high resolution geometric models become more and more complicated, it becomes more difficult to make changes because of the large number of data points. In some instances, animation personnel may work with lower resolution geometric models due to the complexity of the higher resolution geometric models. In such instances, the changes to data points of the lower resolution geometric model may be passed directly to corresponding data points on the higher resolution geometric models. However, the animation personnel may have to manually adjust geometric properties for data points on the higher resolution geometric that do not correspond to points on the lower resolution geometric model. Manually making the changes across the different resolutions to maintain the changes is a time consuming process and is prone to errors between the geometric models. One or more embodiments described herein include techniques and systems for automatically transferring changes made to a geometric model of one resolution to geometric models of other resolutions without manual intervention.

Figure 2:
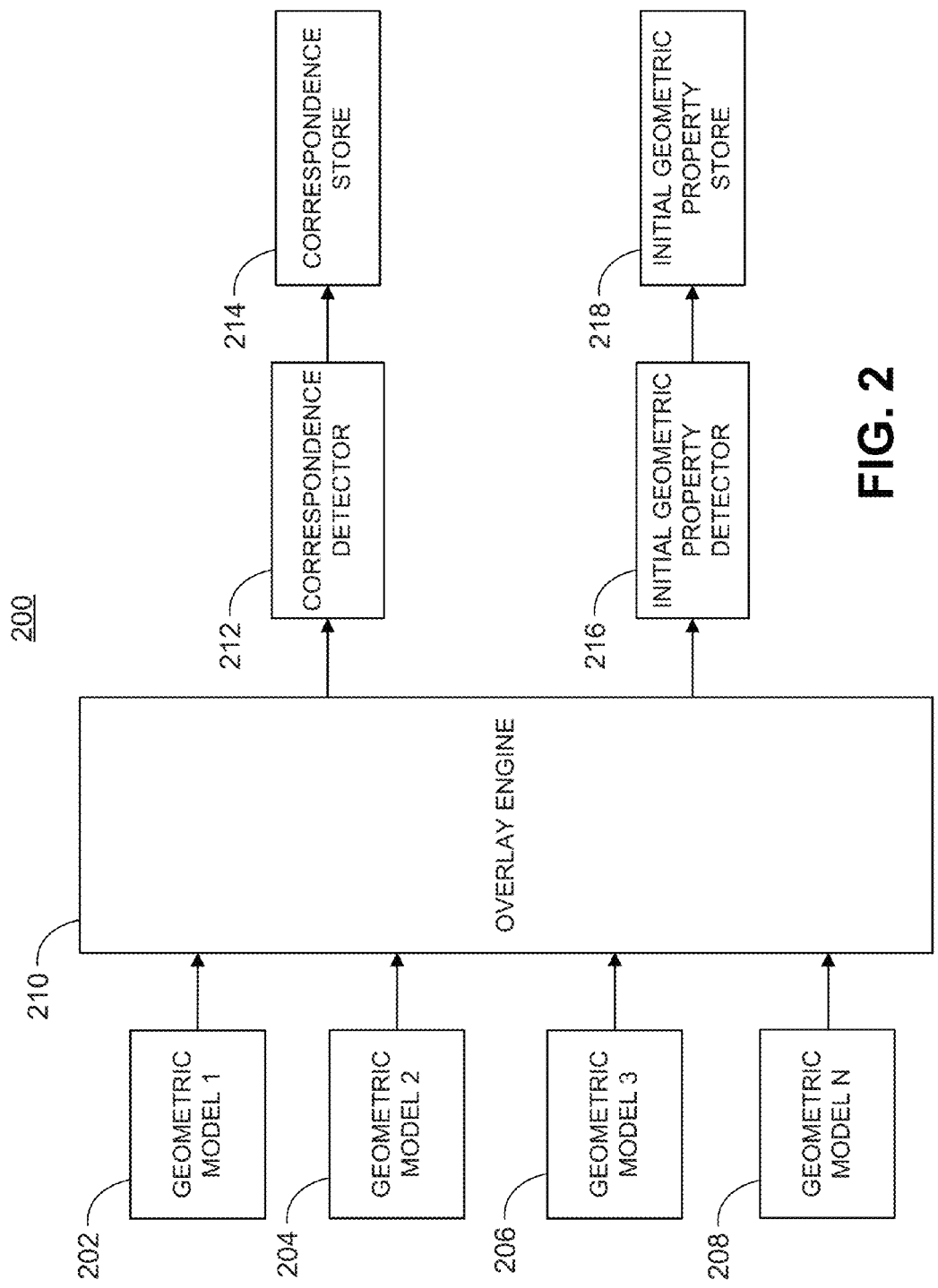
FIG. 2 illustrates an example of a system for determining correspondences between data points of different geometric models.

Referring to FIG. 2, a system 200 is provided for determining correspondences between data points of different geometric models. The system 200 includes an overlay engine 210 that obtains geometric models 202, 204, 206, 208. The different geometric models 202, 204, 206, 208 define different resolutions of geometries of a character. For example, geometric model 202 may be a full resolution model with 100% data points, geometric model 204 may include 75% of the data points of the geometric model 202, geometric model 206 may include 50% of the data points of the geometric model 202, and geometric model 208 may include 25% of the data points of the geometric model 202. Each of the different geometric models 202, 204, 206, 208 may be stored in a separate file. The overlay engine 210 may retrieve the files from memory or a database, and may pull the data points from the files into a common scene or space. While four geometric models 202, 204, 206, 208 are shown in FIG. 2, one of ordinary skill in the art will appreciate that more or fewer geometric models may be generated for a character and used in the system 200.

The overlay engine 210 overlays corresponding data points of the different geometric models 202, 204, 206, 208. For example, all geometric models 202, 204, 206, 208 may include at least corresponding data points (0, 0), (0, 4), (0, 8), (0, 12). The data point format (n, m) refers to a position in space, such as a two-dimensional position. One of ordinary skill in the art will appreciate that the data point format (n, m) is an example, and that the data point format may be in other formats, such as in a three dimensional format (n, m, o). The data points of two or more of the geometric models 202, 204, 206, 208 are overlaid by the overlay engine 210 such that these corresponding data points are overlapping. The overlay engine 210 may then output the overlaid data points to a correspondence detector 212. In some cases, the overlay engine 210 may output a dataset with the overlaid data points of the geometric models 202, 204, 206, 208. In some cases, the overlay engine 210 may create a file with the overlaid data points of the geometric models 202, 204, 206, 208. The overlay engine 210 may output the file to the correspondence detector 212. In some embodiments, the correspondence detector 212 is a separate module (e.g., including hardware and/or software) from the overlay engine 210. In other embodiments, the correspondence detector 212 is part of the overlay engine 210 (e.g., included in the software code, sharing common hardware, or the like).

The correspondence detector 212 can determine correspondences between the data points of the geometric models 202, 204, 206, 208. The correspondences include data points of the geometric models 202, 204, 206, 208 that overlap with data points of the other geometric models 202, 204, 206, 208. In some embodiments, the correspondences are determined for two geometric models at a time. For example, two of the geometric models 202, 204, 206, 208 may be retrieved at a time, and the data points may be overlaid and correspondences determined. The correspondences may be determined between each of the different combinations of models (e.g., between models 202 and 204, between models 202 and 206, between models 202 and 208, between models 204 and 206, between models 204 and 208, and between models 206 and 208). In other embodiments, the correspondences may be determined for all geometric models 202, 204, 206, 208 during a single determination (e.g., by overlaying all data points of all geometric models 202, 204, 206, 208). The correspondences may then be output to a correspondence store 214. The correspondences may be retrieved from the correspondence store 214 for later use.

In some embodiments, initial geometric property values associated with data points of the geometric models 202, 204, 206, 208 are determined by an initial geometric property detector 216 when the correspondences are determined. The initial geometric property values can be stored in an initial geometric property store 218. For example, initial geometric property values for a given data point may include a position of a vertex of the point, a blendshape geometric property value defining an amount of change in position of the vertex when a corresponding blendshape geometry is changed, a skinning weight, or other geometric property associated with the data point. The initial geometric property values can be retrieved and compared to geometric property values after a change is made to one or more of the geometric models 202, 204, 206, 208.

Figure 3:
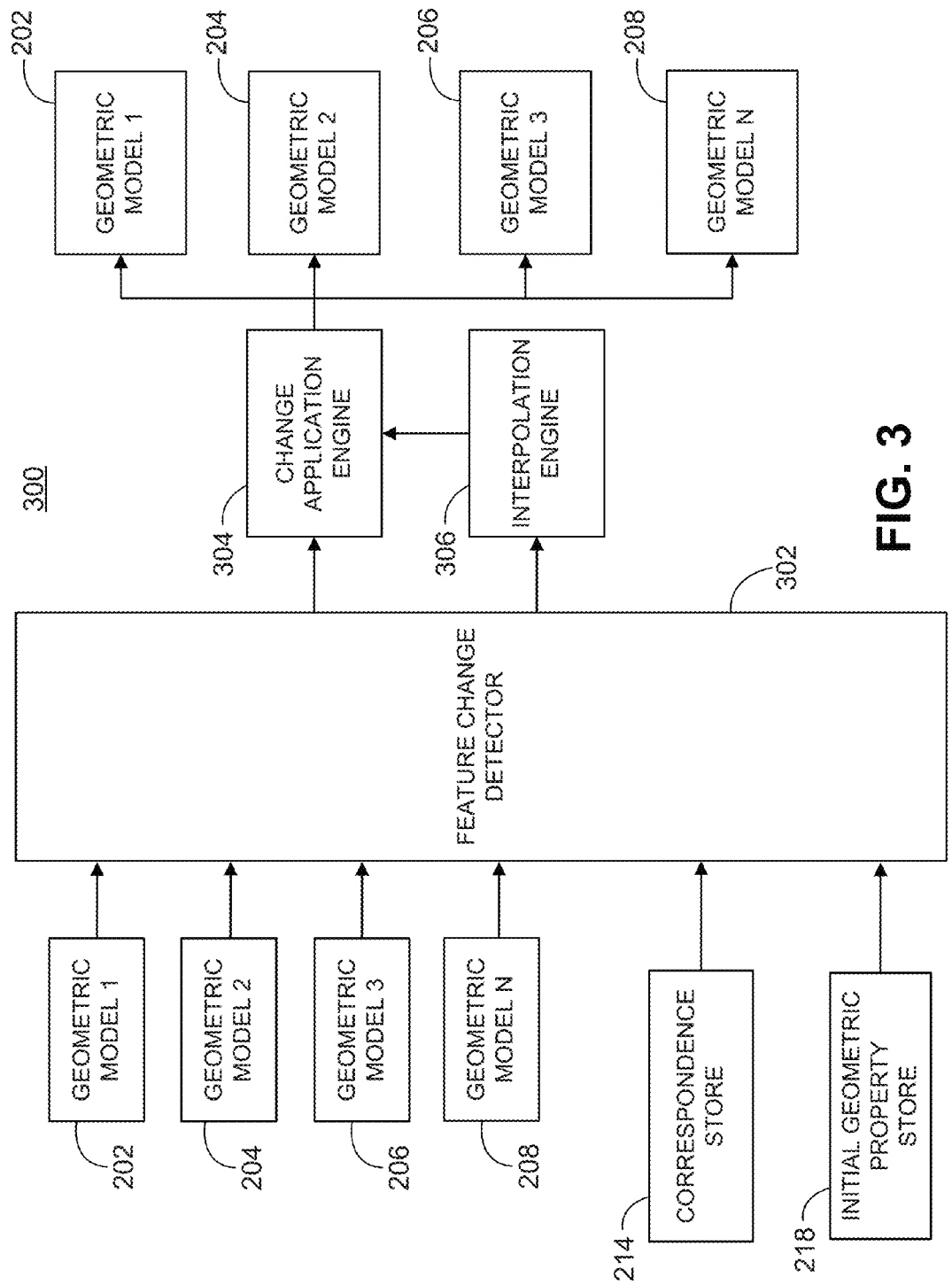
FIG. 3 illustrates an example of a system for transferring feature changes between geometric models.

FIG. 3 illustrates an example of a system 300 for transferring feature changes between geometric models 202, 204, 206, 208. The system 300 includes a feature change detector 302 that can determine a feature change in one or more of the geometric models 202, 204, 206, 208. The feature change detector 302 may retrieve information from the correspondence store 214 and the initial geometric property store 218 to determine feature changes in the geometric models 202, 204, 206, 208. For example, correspondences may be retrieved from the correspondence store 214 to determine which data points (and their associated values) of a geometric model 202, 204, 206, or 208 have correspondences with data points of other geometric models 202, 204, 206, or 208. From the initial geometric property store 218, initial geometric properties of a data point of a geometric model 202, 204, 206, or 208 may be retrieved. The initial geometric properties may be compared to geometric properties of the data point after a change has occurred to determine which geometric properties of the data point have changed. The changes can then be applied to other geometric models 202, 204, 206, or 208.

Once one or more feature changes are detected in a geometric model 202, 204, 206, or 208, the feature change detector 302 can output the feature changes to the change application engine 304 and/or the interpolation engine 306. The feature changes may be determined and output in a change space. A change space includes the difference between updated values and initial values when the correspondences were determined. For example, if a position of a data point vertex moved from position (0, 2) to (0, 6), the feature change in change space is a change of that vertex by (0, +4). By using a change space instead of an absolute position or value, the change application engine 304 can cause certain data point values of other geometric models 202, 204, 206, or 208 to change a certain amount (as indicated by the change space amount) instead of indicating absolute positions or values that should be applied to the data point values. The change space allows changes that have already been applied to be maintained across the geometric models 202, 204, 206, 208. For example, if a modeler, animator, editor, designer, or other animation personnel makes subtle revisions to a high resolution geometric model 202, the feature change from another geometric model 204, 206, 208 can be applied to the previously revised geometric model 202 while maintaining the subtle revisions.

For data points in a geometric model 202, 204, 206, or 208 for which the feature change detector 302 has detected a feature change and that have correspondences in another geometric model, the feature change may be output to the change application engine 304 for application of the change to the corresponding data points in the other geometric models 202, 204, 206, or 208. For data points in a geometric model 202, 204, 206, or 208 that need to be changed based on a change detected in another model 202, 204, 206, or 208, but that do not have corresponding data points in another geometric model, the interpolation engine 306 may interpolate the changes for these data points. The interpolation engine 306 may use a smoothing function that generates a smooth change in those data points to perform the interpolation, as described in further detail below. The interpolated change for these data points may then be output to the change application engine 304. The interpolated change may also be output in a change space, as described above.

Once the detected or interpolated changes are received, the change application engine 304 can apply the changes to each data point of the other geometric models 202, 204, 206, or 208 that require change. Further details of the feature change detector 302, the change application engine 304, and the interpolation engine 306 will be discussed with reference to FIG. 4.

Figure 4:
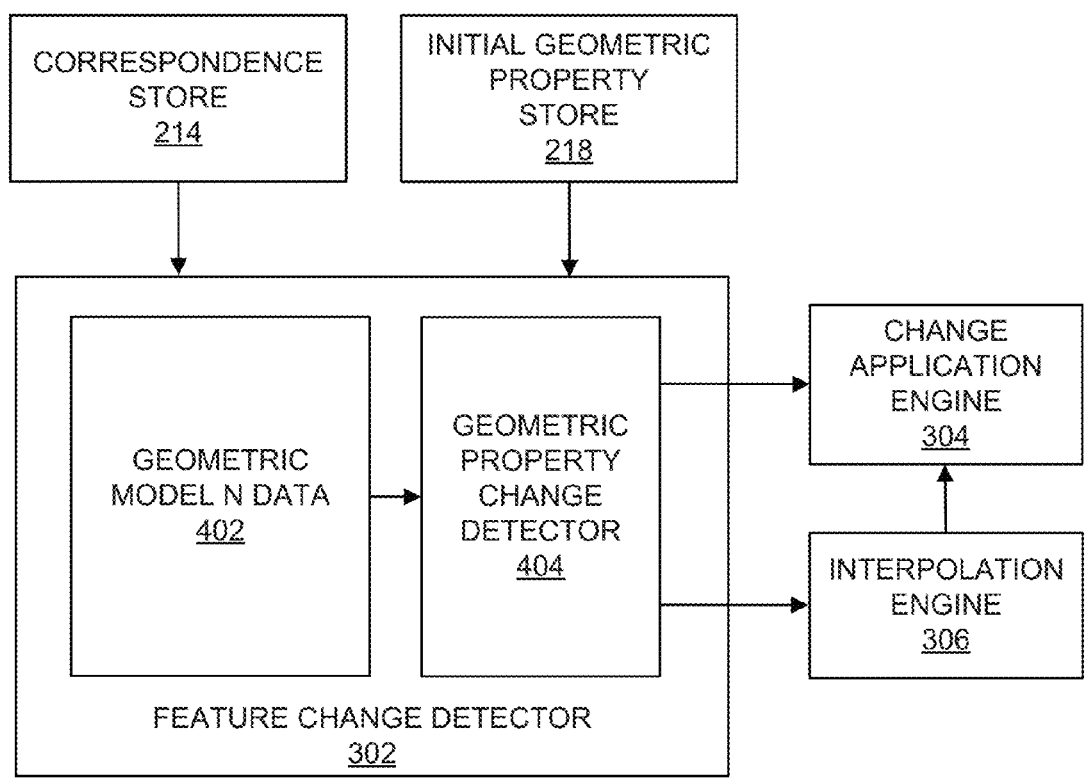
FIG. 4 illustrates an example of a system for determining changes in geometric properties of a geometric model and transferring the changes in geometric properties to one or more other geometric models.

FIG. 4 illustrates an example of a system 400 for determining changes in geometric properties of one or more geometric models and transferring the changes in geometric properties to one or more other geometric models. The system 400 illustrates an example of a feature change detector 302 including a geometric property change detector 404. The geometric property change detector 404 obtains geometric model data 402 of a geometric model (e.g., geometric model 202, 204, 206, or 208). The geometric model data 402 includes revised or updated geometric properties of one or more data points of a geometric model. In some embodiments, the geometric model data 402 includes information for all data points of a geometric model. In some embodiments, the geometric model data 402 includes only information for data points that have a feature change. The geometric property change detector 404 may also retrieve information from the correspondence store 214 and the initial geometric property store 218. The geometric property change detector 404 can use the geometric model data 402, the correspondences, and the initial geometric property information to determine changes in geometric properties of one or more data points in one of the geometric models 202, 204, 206, or 208, and to apply the changes to the other geometric models 202, 204, 206, or 208.

For example, a modeler, animator, editor, designer, or other animation personnel may make a change to a geometric model 206. As previously noted, the geometric model 202 may be a full resolution model with 100% data points, and the geometric model 206 may include 50% of the data points of the geometric model 202. The changes may include changes to one or more geometric properties of several data points of the geometric model 206. Changes in geometric properties may include a change in a vertex position of a data point of the geometric model 206. Changes in geometric properties may also include a change in a blendshape geometric property defining a new amount of change in a position of a data point vertex caused by one or more blendshapes of an animation model associated with the geometric model 206. Another change may include a change in a skinning weight defining a new amount by which a data point vertex moves or changes positions with respect to one or more bones of the geometric model.

The geometric property change detector 404 can determine the geometric property changes to the one or more data points in the geometric model 206 using the geometric model data 402 and the initial geometric property information from the initial geometric property store 218. For example, the geometric property change detector 404 can compare the geometric model data 402 of the geometric model 406 to the initial geometric properties of the geometric model 406. The comparison between the geometric properties may be done on a data point by data point basis to determine if a geometric property has changed for any of the data points.

Once the changes are detected, the geometric property change detector 404 can reference the correspondences from the correspondence store 214 to determine which data points have correspondences in another geometric model 202, 204, or 208. For example, the changes may be transferred from the geometric model 206 to the geometric model 202, which has a higher resolution with a larger number of data points than the geometric model 206. For data points in the geometric model 206 that have corresponding data points in the geometric model 202 (as determined using the correspondences from the correspondence store 214), the geometric property changes may be output to the change application engine 304. The change application engine 304 may directly apply the changes to the corresponding data points. For example, if a change in vertex position of a data point in the geometric model 206 is detected as being moved from position (0, 6) to position (0, 10), the amount of change in a change space of (0, +4) units may be applied to the corresponding data point of the geometric model 202. For example, the corresponding data point of the geometric model 202 may be moved (0, +4) units.

Due to the higher resolution geometric model 202 having a higher number of data points than the lower resolution geometric model 206, the data points of the geometric model 206 will have correspondences with a subset of the data points of the geometric model 202. As a result, some of the data points of the higher resolution geometric model 202 will not have correspondences with data points of the lower resolution geometric model 206. For the data points of the geometric model 202 that do not have a correspondence to the changed data points of the geometric model 206, the interpolation engine 306 may interpolate a corresponding change in geometric properties using a smoothing function that generates a smooth change in those geometric properties.

In some embodiments, a discrete Laplacian solver may be used by the interpolation engine 306 to interpolate changes in geometric property values of data points of the geometric model 202 that do not have correspondences in the lower resolution geometric model 206. A discrete Laplace operator on a data point vertex of a geometric model mesh describes the differences between the value on this vertex and an average value of its one-ring neighbors. The one-ring neighbors of the vertex are vertices that are directly connected to this vertex on the mesh. The Laplace operator on a vertex is therefore a measurement of smoothness.

For example, with respect to the higher resolution geometric model 202, there are geometric property vertex values defined on a subset of vertices on the entire mesh of the geometric model 202. The interpolation engine 306 can operate so that these defined vertex values interpolate smoothly to other vertices that do not have values due to the lack of correspondence to points of the lower resolution geometric model 206. The interpolation process solves for values on all the vertices such that the values of their Laplace operators are as small as possible, while keeping values on those vertices that already have correspondence.

Once the interpolation engine 306 interpolates the values indicating the amount of change needed for geometric properties of data points of the geometric model 202 (based on the changed data points of the geometric model 206), the geometric property changes represented by the values are output to the change application engine 304. The change application engine 304 may then apply the changes to the appropriate data points of the geometric model 202. For example, if changes in vertex positions of two data points A and C in the geometric model 206 are detected as being moved from position (0, 5) to position (0, 12), and from position (0, 6) to position (0, 15), respectively, an amount of change in a change space for a point B in the geometric model 202 that lies near two corresponding data points A' and C' (with correspondences to points A and C in the geometric model 206) may be interpolated by the interpolation engine 306 to be (0, +8) using the smoothing function. The change application engine 304 may then apply the change amount to the data point B of the geometric model 202 that lies near the two data points A' and C'. For example, the data point B of the geometric model 202 may be moved (0, +8) units.

Figure 5:
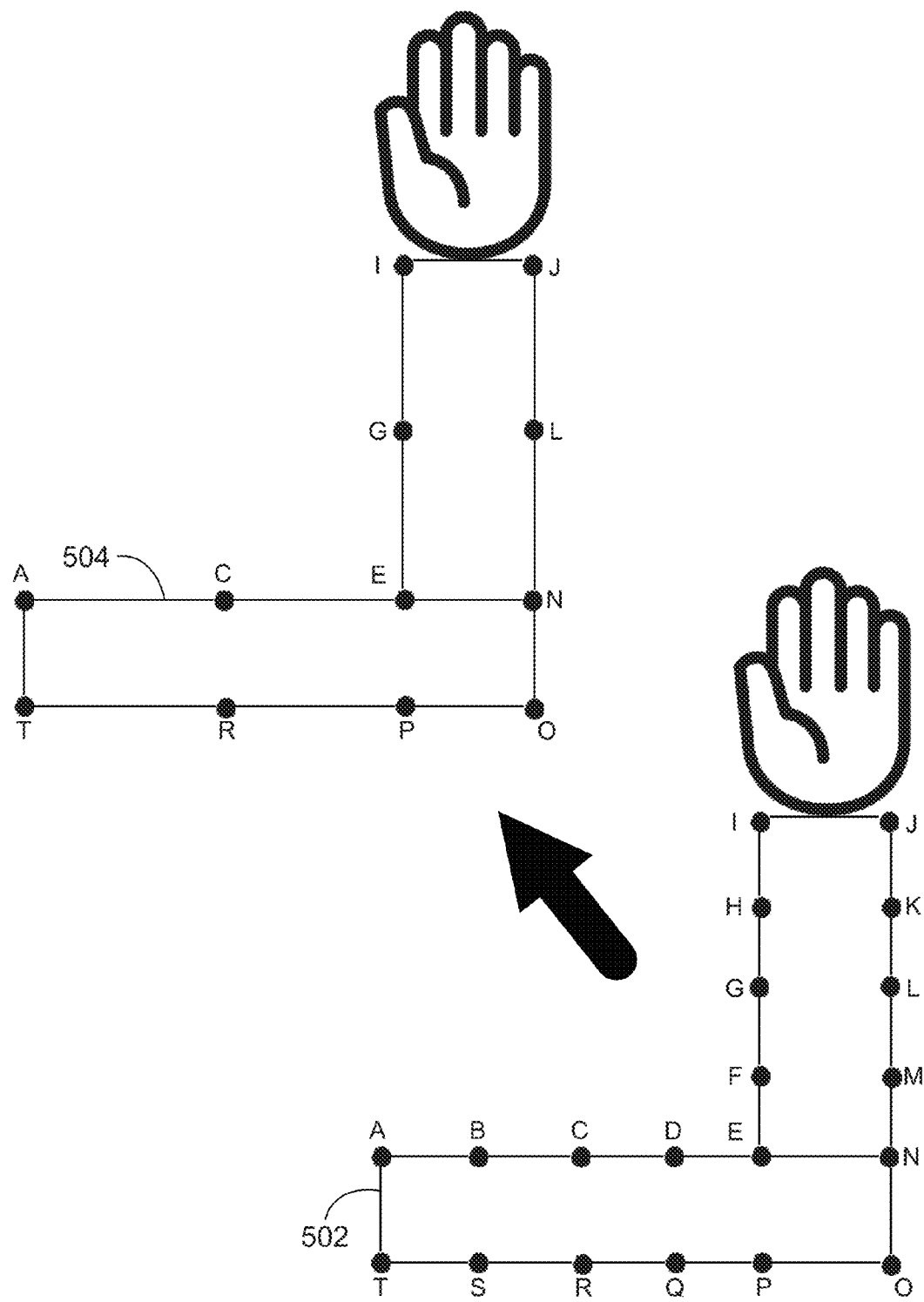
FIG. 5 illustrates an example of two different geometric models that have different numbers of data points.

FIG. 5 illustrates one example of two geometric models 502, 504 for a character that have different resolutions with different numbers of data points. The geometric model 502 is a higher resolution model than the geometric model 504. For example, the geometric model 502 has data points A-T, whereas geometric model 504 has data points A, C, E, G, I, J, L, N, O, P, R, and T. The overlay engine 210 may be used to overlay corresponding data points of the different geometric models 502, 504. For example, the overlay engine 210 may retrieve one or more files that include the geometric models 502, 504, and may overlay the datasets from the two files. The overlay engine 210 may then output the overlaid data points to the correspondence detector 212 (e.g., as a dataset, a file, or other suitable data format).

The correspondence detector 212 can use the overlaid data points to determine correspondences between the data points of the geometric models 502, 504. For example, the correspondence detector 212 may determine that the points A, C, E, G, I, J, L, N, O, P, R, and T from both geometric models 502, 504 are overlapping, and that these points are corresponding data points. The data points may be associated with a position in space, such as an absolute two-dimensional position (n, m) or three-dimensional position (n, m, o).

Figure 6:
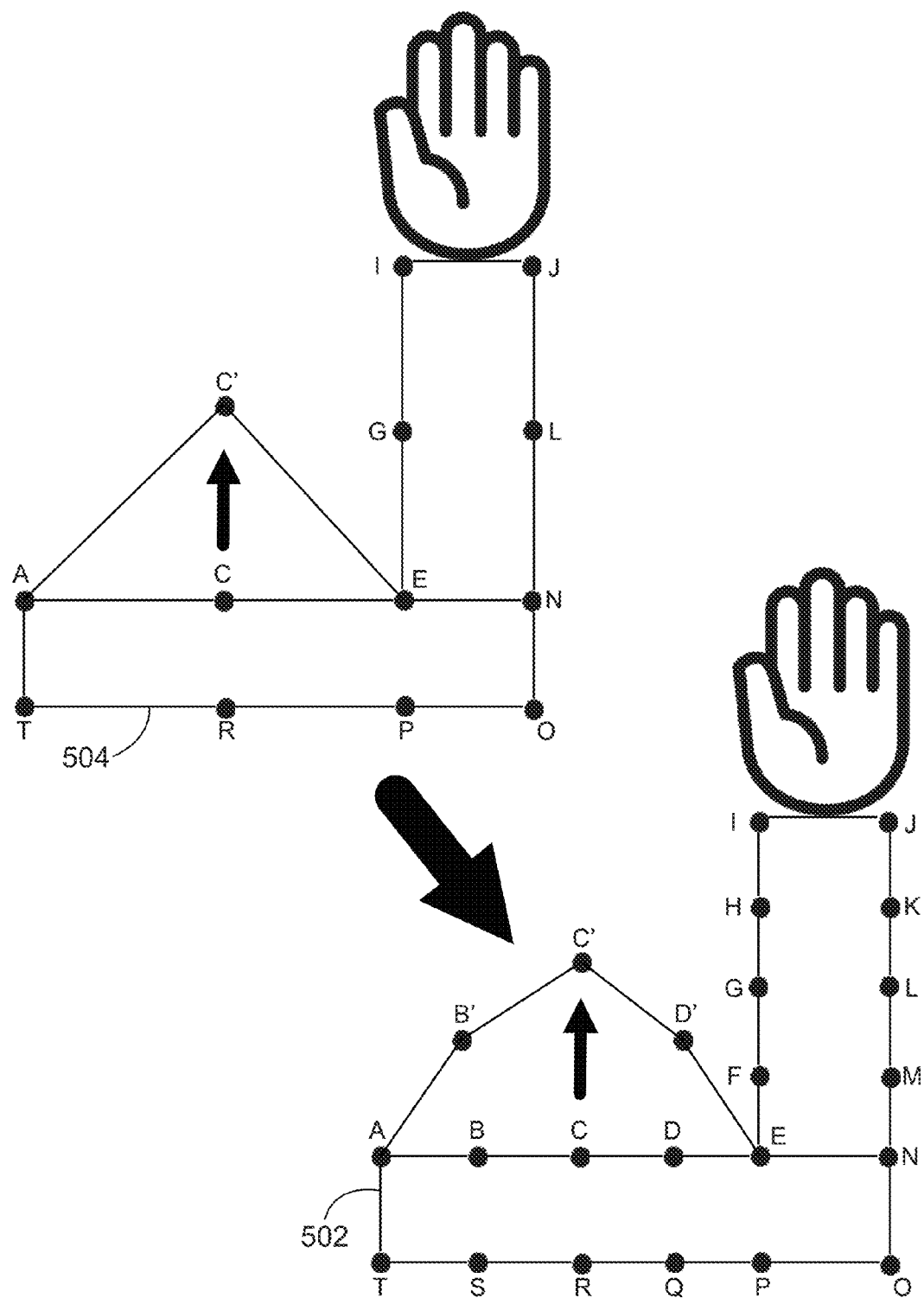
FIG. 6 illustrates an example of a feature change in a geometric model being transferred to another geometric model.

FIG. 6 illustrates an example of a feature change that occurs in the geometric model 504 being transferred to the geometric model 502. For example, the feature change detector 302 may determine that a feature change has occurred in the geometric model 504. The feature change may include changes in one or more geometric properties of one or more data points of the geometric model 504. As illustrated in FIG. 6, the point C has moved to a different position, represented by point C'. The geometric property change detector 404 of the feature change detector 302 may obtain geometric model data of the geometric model 504. The geometric model data may include information related to the data points of the geometric model 504 after a change has occurred. The geometric property change detector 404 may also retrieve information from the correspondence store 214 and the initial geometric property store 218. The geometric property change detector 404 can use the geometric model data to compare the data points of the modified geometric model 504 to the initial geometric properties of the data points to determine which data points have undergone one or more geometric property changes. For example the geometric property change detector 404 may determine that the initial vertex position of point C was at (0, 1) when the correspondences were determined. The geometric property change detector 404 may then determine that the current position of point C (at C') is at position (0, 4). Based on this information, the geometric property change detector 404 may determine that the point C has undergone a vertex position change of (0, +3).

In some embodiments, the geometric property change detector 404 may determine that one or more other geometric properties of point C, or other data point, of the geometric model 504 have changed. For example, the vertex of point C of geometric model 504 may have one or more blendshape geometric property values. Each of the blendshape geometric property values is related to a blendshape of an animation model associated with the geometric model 504 that controls the geometry of point C. One or more of the blendshape geometric properties may be changed for point C of the geometric model 504. As previously described, the blendshape geometric property defines an amount of change in a position of a vertex of point C that is caused by one or more of the blendshapes. For example, the blendshape geometric property value may define how much point C changes when an adjustable control value is applied to a particular blendshape. Adjustable controls of the animation model can be controlled to define how a blendshape affects different data points. For example, a range of control values that define the geometry of the blendshape controlling point C may go from 0 to 1. An initial blendshape geometric property value for point C may define that the vertex of point C changes from position (0, 0) to position (0, 50) when the control value is dialed to 1. A modeler, animator, editor, designer, or other animation personnel may change the blendshape geometric property so that the blendshape causes the vertex of point C to change from position (0, 0) to position (0, 75) when the control value is dialed to 1. Accordingly, the geometric change detector 404 may detect that a change of twenty five units has occurred in the blendshape geometric property for point C of the geometric model 504.

In another example, the geometric property change detector 404 may determine that a skinning weight geometric property has changed for point C, or other point, of the geometric model 504. As previously described, a skinning weight geometric property is comprised in the animation model associated with the geometric model 504, and defines a weight associated with a vertex of a data point of a geometric model. The skinning weight for point C of the geometric model 504 defines an amount by which the vertex of point C moves or changes positions with respect to one or more bones of the geometric model. For example, the point C may correspond to a point on the skin of a character's bicep. A Humerus bone may be associated with the point C, and skinning weights may be defined that define a percentage that the point C moves with respect to the Humerus bone. For example, if the character moves the forearm with the Ulna and Radius bones in an upward motion, the skinning weights may cause the point C to follow the Humerus bone 100%. A modeler, animator, editor, designer, or other animation personnel may determine that the point C should follow the Humerus bone by only 80%, and may adjust the skinning weight geometric property for point C of the geometric model 504 accordingly. The geometric change detector 404 may thus detect that a change of twenty percent has occurred in the skinning weight geometric property for point C of the geometric model 504.

Once the geometric property changes are detected by the geometric property change detector 404, the changes may be output to the change application engine 304 or the interpolation engine 306, as described above. The changes may then be applied to the higher resolution geometric model 502. For example, the change application engine 304 may receive the changes for data points in the geometric model 504 that have corresponding data points in the geometric model 502. The correspondences may be determined by the feature change detector 302 using the correspondences from the correspondence store 214. As illustrated in FIG. 6, the data point C of geometric model 504 has undergone a vertex position change from point C to point C'. The vertex position change may be applied to the corresponding data point C in the geometric model 502. For example, a vertex position change of (0, +3) may be applied to data point C of the geometric model 502 to move the data point from point C to point C' using the detected change amount. Any other geometric property changes (e.g., blendshape geometric property change, skinning weight geometric property change, or other geometric property change) may also be applied directly to the corresponding data point C.

As can be seen in FIG. 6, the data points B and D of geometric model 502 do not have correspondences in geometric model 504, but must be moved to correspond to the feature change of point C. The interpolation engine 306 may be used to determine the desired change amount for data points B and D. For example, the interpolation engine 306 may interpolate a change in vertex position of points B and D using a smoothing function that generates a smooth vertex position change taking into account the change of points A, C, and E. The Laplacian solve described above may be used by the interpolation engine 306 to perform the interpolation. In one example, the interpolation engine 306 may take into account that points A and E of geometric model 504 did not move at all, and that point C moved (0, +3). Using this data, the interpolation engine 306 may interpolate that points B and D need to move (0, +1.25) to points B' and D', respectively. One of ordinary skill in the art will appreciate that this is an example for illustrative purposes, and that other interpolation results may be determined using the Laplacian solve techniques described herein, or other suitable interpolation techniques. Any other geometric property changes (e.g., blendshape geometric property change, skinning weight geometric property change, or other geometric property change) may also be interpolated for points B and D. The interpolated geometric property changes are then output to the change application engine 304 and applied to the points B and D.

Figure 7:
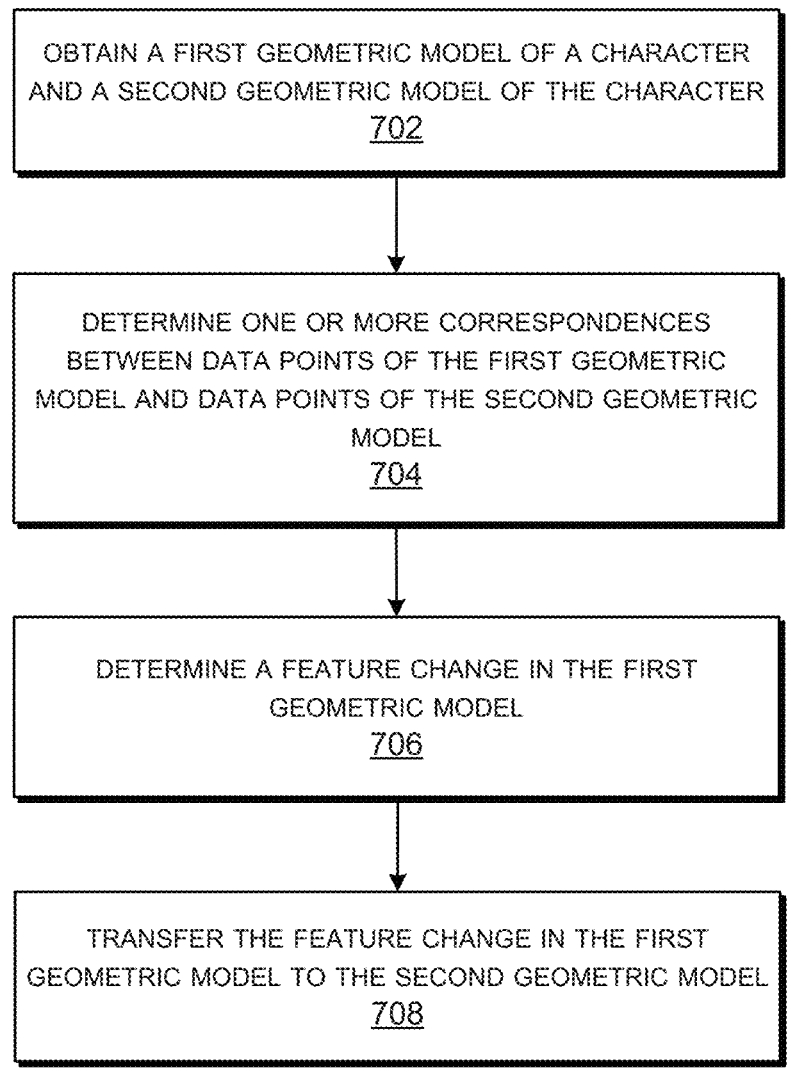
FIG. 7 is a flow chart illustrating a process for transferring changes in geometric properties between geometric models of a character having different resolutions.

FIG. 7 illustrates an example of a process 700 of transferring changes in geometric properties between geometric models of a character having different resolutions. Process 700 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In some aspects, the process 700 may be performed by a computing system, such as one or more of the systems 200, 300, or 800. For example, the computer system 800 may implement one or more of the systems 200 or 300 to perform the method 700.

At 702, the process 700 includes obtaining a first geometric model of the character and a second geometric model of the character, the first and second geometric models having different resolutions with different numbers of data points. In some examples using the figures described above, the overlay engine 210 may obtain two or more of the geometric models 202, 204, 206, 208. In some embodiments, the first and second geometric models may be stored in separate files. The files may be retrieved from memory or a database.

At 704, the process 700 includes determining one or more correspondences between data points of the first geometric model and data points of the second geometric model. The one or more correspondences include one or more data points of the first geometric model that overlap with one or more data points of the second geometric model. In some examples, determining the one or more correspondences between the data points of the first geometric model and the data points of the second geometric model includes overlaying the data points of the first geometric model and the data points of the second geometric model. In some embodiments, the data points of the first and second geometric models may be pulled from respective files and overlaid in a common scene or space (e.g., a screen space or scene). In one example, the overlay engine 210 may overlay the points of the first and second geometric models. The overlay engine 210 may then output the overlaid data points to a correspondence detector 212 for determining the one or more correspondences, as described above with respect to FIG. 2. The correspondences may then be output to a correspondence store 214, and may be retrieved for later use.

In some embodiments, the data points of the first geometric model overlap with a subset of the data points of the second geometric model. For example, the first and second geometric models may define different resolutions of geometries of the character. In one example, the second geometric model may be a full resolution model with 100% data points, and the first geometric model may include a subset of the data points of the second geometric model (e.g., 5%, 10%, 25%, 50%, 75%, or any other percentage of the data points of the second geometric model). In this example, due to the second geometric model having a higher number of data points than the lower resolution first geometric model, the data points of the first geometric model will overlap with a subset of the data points of the second geometric model.

At 706, the process 700 includes determining a feature change in the first geometric model. The feature change includes a change in a geometric property of at least one data point of the first geometric model relative to an initial geometric property of the at least one data point prior to the change. In one example, the feature change detector 302 may determine the feature change in the first geometric model. In some embodiments, the initial geometric property (and other initial geometric properties of data points of the first and second geometric models) may be determined when the correspondences are determined. In one example, the initial geometric properties may be determined using the initial geometric property detector 216, as described above with respect to FIG. 2. The initial geometric property values can be stored in an initial geometric property store 218.

In some embodiments, the geometric property of the at least one data point of the second geometric model includes a position of a vertex of the at least one data point, an amount of change in a position of the vertex of the at least one data point, or a weight (or skinning weight) associated with the vertex of the at least one data point that defines an amount by which the vertex of the at least one data point changes with respect to a skeleton of the second geometric model, or other geometric property associated with the data point. In some examples, the initial geometric property value may also include a position of a vertex of the point, a blendshape geometric property value, a skinning weight, or other geometric property associated with the data point. The initial geometric property values can be retrieved and compared to geometric property values after a change is made to one or more of the first and second geometric models.

At 708, the process 700 includes transferring the feature change in the first geometric model to the second geometric model using the one or more correspondences. In some embodiments, transferring the feature change includes interpolating a change in a geometric property of at least one data point of the second geometric model. The interpolation occurs when the first geometric model is of a lower resolution than the second geometric model. In one example, the feature change detector 302 may retrieve information from the correspondence store 214 and the initial geometric property store 218 to determine the feature changes in the first geometric model, which may include any of the models 202, 204, 206, or 208. Further details relating to the feature change transfer and interpolation are described with respect to FIGS. 2-6.

In some embodiments, determining the feature change includes determining a change in a position of a vertex of the at least one data point of the first geometric model. In such embodiments, interpolating the change in the geometric property includes interpolating a change in a position of a vertex of the at least one data point of the second geometric model.

In some embodiments, determining the feature change includes determining an amount of change in a position of a vertex of the at least one data point of the first geometric model caused by one or more blendshapes of a first animation model for the character, the first animation model including blendshapes that are configured to change features of the first geometric model of the character. In some examples, interpolating the change in the geometric property includes interpolating an amount of change in a position of a vertex of the at least one data point of the second geometric model caused by one or more blendshapes of a second animation model for the character, the second animation model including blendshapes that are configured to change features of the second geometric model of the character.

In some embodiments, determining the feature change includes determining a change in a weight associated with a vertex of the at least one data point of the first geometric model, wherein the weight defines an amount by which a position of the vertex changes with respect to a skeleton of the first geometric model. In some examples, interpolating the change in the geometric property includes interpolating a change in a weight associated with a vertex of the at least one data point of the second geometric model, wherein the weight defines an amount by which a position of the vertex changes with respect to a skeleton of the second geometric model.

In some embodiments, determining the feature change includes determining the change in the geometric property in a change space. As previously described, the change space includes an amount of change in the geometric property relative to an initial geometric property of the at least data point of the first geometric model.

In some embodiments, interpolating the change in the geometric property of the at least one data point of the second geometric model includes performing a Laplace smoothing function. As previously described, a Laplacian solve may be used (e.g., by the interpolation engine 306) to interpolate changes in geometric property values of data points of the second geometric model that do not have correspondences in the first geometric model.

Using the above-described systems and techniques, changes across different resolutions of geometric models, and corresponding animation models, for a character may be maintained. It is an important aspect of animated works to maintain the changes across the different resolutions of a character's geometric models and animation models so that the details of the character (e.g., overall movement, shape, and other features of the character) remain consistent regardless of which geometric model is being used at any given moment in a production. The techniques and systems described herein allow these changes in either a geometric model or corresponding animation model to be transferred to other resolutions automatically without requiring manual changes to the geometric and animation models.

Figure 8:
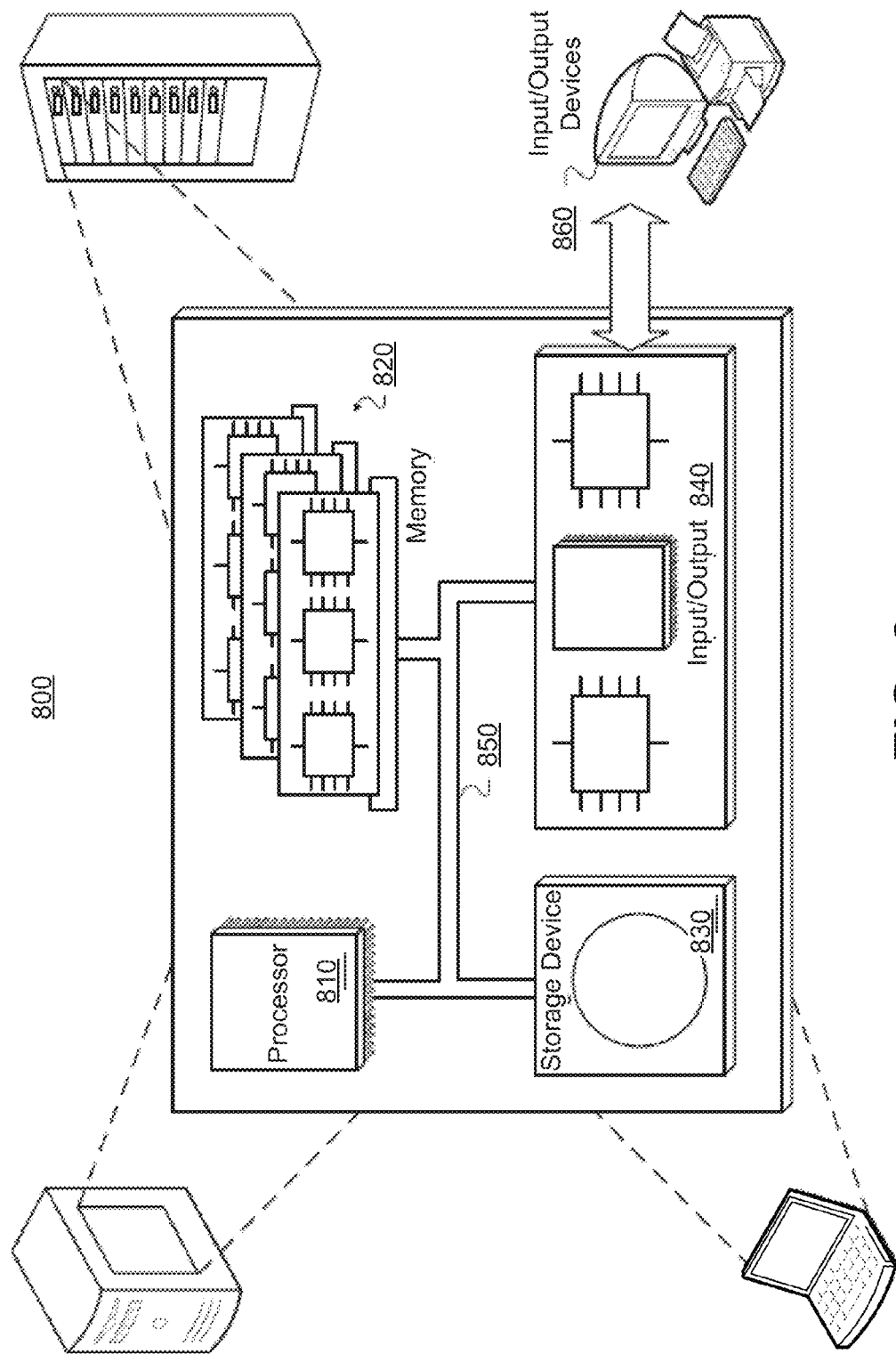
FIG. 8 shows an example of a computer system that may be used in various embodiments of the present invention.

Referring to FIG. 8, a schematic diagram is shown of an example of a computer system 800. This system is exemplary only and one having skill in the art will recognize that variations and modifications are possible. The system 800 can be used for the operations described above. For example, the computer systems shown in FIG. 8 may be used to implement any or all of the initialization (e.g., face annotation, skull fitting, constraint creation) and stabilization (e.g., skin energy or error determination, nose energy or error determination) techniques and routines described herein.

The system 800 includes a processor 810, a memory 820, a storage device 830, and an input/output interface 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to provide graphical information via input/output interface 840 for display on a user interface of one or more input/output device 860.

The memory 820 stores information within the system 800 and may be associated with various characteristics and implementations. For example, the memory 820 may include various types of computer-readable medium such as volatile memory, a non-volatile memory and other types of memory technology, individually or in combination.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 860 provides input/output operations for the system 800. In one implementation, the input/output device 860 includes a keyboard and/or pointing device. In another implementation, the input/output device 860 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the invention have been described. Nevertheless, it will be understood that various modification may be made without departing from the scope of the invention.

What is claimed is:

1. A computer-implemented method of transferring changes in geometric properties between geometric models of a character, comprising:
   obtaining a first geometric model of the character and a second geometric model of the character, the first and second geometric models having different resolutions with different numbers of data points,
   determining one or more correspondences between data points of the first geometric model and data points of the second geometric model, the one or more correspondences including one or more data points of the first geometric model that overlap with one or more data points of the second geometric model;
   determining an initial position of at least one data point of the first geometric model;
   determining a feature change in the first geometric model, the feature change including a change in a position of the at least one data point of the first geometric model relative to the initial position of the at least one data point prior to the change, wherein the feature change is maintained in a change space for the first geometric model, the change space including differences between updated values of the data points of the first geometric model and initial values of the data points of the first geometric model; and
   transferring the change space associated with the first geometric model to the second geometric model using the one or more correspondences, the transferring including applying the differences between the updated values and the initial values of the data points of the first geometric model to the corresponding one or more data points of the second geometric model that overlap with the one or more data points of the first geometric model and interpolating a change in a position of at least one data point of the second geometric model that does not overlap the at least one data point of the first geometric model.

2. The method of claim 1, wherein determining the one or more correspondences between the data points of the first geometric model and the data points of the second geometric model includes overlaying the data points of the first geometric model and the data points of the second geometric model.

3. The method of claim 1, wherein the data points of the first geometric model overlap with a subset of the data points of the second geometric model.

4. The method of claim 1, wherein a geometric property of a data point of the second geometric model includes at least one or more of a position of the data point, an amount of change in the position of the data point, or a weight associated with the data point that defines an amount by which the data point changes with respect to a skeleton of the second geometric model.

5. The method of claim 1, wherein the initial position of the at least one data point of the first geometric model is determined when the one or more correspondences are determined.

6. The method of claim 1, wherein determining the feature change further includes determining an amount of change in the position of the at least one data point of the first geometric model caused by one or more blendshapes of a first animation model for the character, the first animation model including blendshapes that are configured to change features of the first geometric model of the character.

7. The method of claim 6, wherein interpolating the change in the position of the at least one data point of the second geometric model includes interpolating an amount of change in the position of the at least one data point caused by one or more blendshapes of a second animation model for the character, the second animation model including blendshapes that are configured to change features of the second geometric model of the character.

8. The method of claim 1, wherein determining the feature change further includes determining a change in a weight associated with the at least one data point of the first geometric model, wherein the weight defines an amount by which a position of the at least one data point changes with respect to a skeleton of the first geometric model.

9. The method of claim 8, wherein interpolating the change in the position of the at least one data point of the second geometric model includes interpolating a change in a weight associated with the at least one data point, wherein the weight defines an amount by which the position of the at least one data point changes with respect to a skeleton of the second geometric model.

10. The method of claim 1, wherein the initial values of the data points of the first geometric model are determined when the one or more correspondences are determined.

11. The method of claim 1, wherein interpolating the change in the position of the at least one data point of the second geometric model includes performing a Laplace smoothing function.

12. A system for transferring changes in geometric properties between geometric models of a character, comprising:
    a memory storing a plurality of instructions; and
    one or more processors configurable to:
      obtain a first geometric model of the character and a second geometric model of the character, the first and second geometric models having different resolutions with different numbers of data points;
      determine one or more correspondences between data points of the first geometric model and data points of the second geometric model, the one or more correspondences including one or more data points of the first geometric model that overlap with one or more data points of the second geometric model;

determine an initial position of at least one data point of the first geometric model;

determine a feature change in the first geometric model, the feature change including a change in a position of the at least one data point of the first geometric model relative to the initial position of the at least one data point prior to the change, wherein the feature change is maintained in a change space for the first geometric model, the change space including differences between updated values of the data points of the first geometric model and initial values of the data points of the first geometric model; and transfer the change space associated with the first geometric model to the second geometric model using the one or more correspondences, the transferring including applying the differences between the updated values and the initial values of the data points of the first geometric model to the corresponding one or more data points of the second geometric model that overlap with the one or more data points of the first geometric model and interpolating a change in a position of at least one data point of the second geometric model that does not overlap the at least one data point of the first geometric model.

13. The system of claim 12, wherein determining the one or more correspondences between the data points of the first geometric model and the data points of the second geometric model includes overlaying the data points of the first geometric model and the data points of the second geometric model, and wherein the data points of the first geometric model overlap with a subset of the data points of the second geometric model.

14. The system of claim 12, wherein a geometric property of a data point of the second geometric model includes at least one or more of a position of the data point, an amount of change in the position of the data point, or a weight associated with the data point that defines an amount by which of the data point changes with respect to a skeleton of the second geometric model.

15. The system of claim 12, wherein the initial position of the at least one data point of the first geometric model is determined when the one or more correspondences are determined.

16. The system of claim 12, wherein:

determining the feature change further includes determining an amount of change in the position of the at least one data point of the first geometric model caused by one or more blendshapes of a first animation model for the character, the first animation model including blendshapes that are configured to change features of the first geometric model of the character; and interpolating the change in the position of the at least one data point of the second geometric model includes interpolating an amount of change in the position of the at least one data point caused by one or more blendshapes of a second animation model for the character, the second animation model including blendshapes that are configured to change features of the second geometric model of the character.

17. The system of claim 12, wherein:

determining the feature change further includes determining a change in a weight associated with the at least one data point of the first geometric model, wherein the weight defines an amount by which a position of the vertex at least one data point changes with respect to a skeleton of the first geometric model; and interpolating the change in the position of the at least one data point of the second geometric model includes interpolating a change in a weight associated with the at least one data point, wherein the weight defines an amount by which the position of the at least one data point changes with respect to a skeleton of the second geometric model.

18. The system of claim 12, wherein the initial values of the data points of the first geometric model are determined when the one or more correspondences are determined.

19. A computer-readable memory storing a plurality of instructions executable by one or more processors, the plurality of instructions comprising:

instructions that cause the one or more processors to obtain a first geometric model of the character and a second geometric model of the character, the first and second geometric models having different resolutions with different numbers of data points;

instructions that cause the one or more processors to determine one or more correspondences between data points of the first geometric model and data points of the second geometric model, the one or more correspondences including one or more data points of the first geometric model that overlap with one or more data points of the second geometric model;

instructions that cause the one or more processors to determine an initial position of at least one data point of the first geometric model;

instructions that cause the one or more processors to determine a feature change in the first geometric model, the feature change including a change in a position of the at least one data point of the first geometric model relative to the initial position of the at least one data point prior to the change, wherein the feature change is maintained in a change space for the first geometric model, the change space including differences between updated values of the data points of the first geometric model and initial values of the data points of the first geometric model; and instructions that cause the one or more processors to transfer the change space associated with the first geometric model to the second geometric model using the one or more correspondences, the transferring including applying the differences between the updated values and the initial values of the data points of the first geometric model to the corresponding one or more data points of the second geometric model that overlap with the one or more data points of the first geometric model and interpolating a change in a position of at least one data point of the second geometric model that does not overlap the at least one data point of the first geometric model.

20. The computer-readable memory of claim 19, wherein a geometric property of a data point of the second geometric model includes at least one or more of a position of the data point, an amount of change in the position of the data point, or a weight associated with the data point that defines an amount by which the data point changes with respect to a skeleton of the second geometric model.

* * * * *

UNITED STATES PATENT AND TRADEMARK OFFICE
CERTIFICATE OF CORRECTION

PATENT NO.        : 9,858,700 B2
APPLICATION NO.   : 14/711542
DATED             : January 2, 2018
INVENTOR(S)       : Rachel Rose et al.

It is certified that error appears in the above-identified patent and that said Letters Patent is hereby corrected as shown below:

In the Claims

Column 24, Claim 17, Line 3:
Replace "vertex at least one data point changes with respect to a" with --at least one data point changes with respect to a--

Signed and Sealed this
Fifth Day of June, 2018

Andrei Iancu
*Director of the United States Patent and Trademark Office*